United States Patent
Liu et al.

(10) Patent No.: US 10,364,725 B2
(45) Date of Patent: Jul. 30, 2019

(54) AFTERTREATMENT SYSTEMS FOR DUAL-FUEL ENGINES

(71) Applicant: Cummins Emission Solutions, Inc., Columbus, IN (US)

(72) Inventors: Yi Liu, Columbus, IN (US); Arvind V. Harinath, Columbus, IN (US); Arpad Somogyvari, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 110 days.

(21) Appl. No.: 15/518,162

(22) PCT Filed: Oct. 16, 2014

(86) PCT No.: PCT/US2014/060861
§ 371 (c)(1),
(2) Date: Apr. 10, 2017

(87) PCT Pub. No.: WO2016/060668
PCT Pub. Date: Apr. 21, 2016

(65) Prior Publication Data
US 2017/0284253 A1    Oct. 5, 2017

(51) Int. Cl.
*F01N 3/10*    (2006.01)
*F01N 3/20*    (2006.01)
(Continued)

(52) U.S. Cl.
CPC .............. *F01N 3/208* (2013.01); *F01N 3/101* (2013.01); *F02D 19/105* (2013.01);
(Continued)

(58) Field of Classification Search
CPC ...... F01N 3/101; F01N 3/208; F01N 2260/04; F01N 2570/10; F01N 2570/12;
(Continued)

(56) References Cited

U.S. PATENT DOCUMENTS 8,173,087 B2    5/2012    Wei et al.
8,182,777 B2    5/2012    Andersen et al.
(Continued)

FOREIGN PATENT DOCUMENTS

KR    10-1381034    3/2014
WO    WO 95/27128    10/1995

OTHER PUBLICATIONS

International Search Report and Written Opinion issued for PCT/US2014/060861, dated Feb. 4, 2015, 10 pages.

*Primary Examiner* — Brandon D Lee
(74) *Attorney, Agent, or Firm* — Foley & Lardner LLP (57) ABSTRACT

Systems and methods for an aftertreatment system configured for use with a dual-fuel engine system are described. The method comprises determining an operating mode of the dual-fuel engine. Upon determining that the dual-fuel engine is operating in a dual-fuel mode or a natural gas mode, the dual-fuel engine operates in a stoichiometric operating condition, and the exhaust is received into a three-way catalyst communicatively connected to a selective catalytic reduction catalyst. Upon determining that the dual-fuel engine is not operating in the dual-fuel mode or the natural gas mode, the engine operates in a lean operating condition.

24 Claims, 3 Drawing Sheets (51) Int. Cl.
  *F02D 19/10* (2006.01)
  *F02D 41/00* (2006.01)
(52) U.S. Cl.
  CPC ...... *F01N 2260/04* (2013.01); *F01N 2570/10* (2013.01); *F01N 2570/12* (2013.01); *F01N 2570/14* (2013.01); *F01N 2610/02* (2013.01); *F02D 41/0025* (2013.01); *Y02T 10/22* (2013.01); *Y02T 10/24* (2013.01); *Y02T 10/36* (2013.01)
(58) Field of Classification Search
  CPC ............. F01N 2570/14; F01N 2610/02; F02D 19/105; F02D 41/0025; Y02T 10/22; Y02T 10/24; Y02T 10/36
  See application file for complete search history.

(56) References Cited

U.S. PATENT DOCUMENTS

| | | | |
|---|---|---|---|
| 8,211,393 | B2 | 7/2012 | Arnold et al. |
| 2002/0185086 | A1 | 12/2002 | Newman et al. |
| 2011/0192144 | A1* | 8/2011 | Yasui ................. F01N 3/208 60/276 |
| 2012/0304639 | A1 | 12/2012 | Yonushonis et al. |
| 2013/0046454 | A1 | 2/2013 | Cowgill et al. |
| 2016/0101413 | A1* | 4/2016 | Fedeyko ............ B01D 53/9436 422/171 |

* cited by examiner

FIG. 5

AFTERTREATMENT SYSTEMS FOR DUAL-FUEL ENGINES

CROSS-REFERENCE TO RELATED APPLICATIONS

The present application is a National Stage of PCT Application No. PCT/US2014/060861, filed Oct. 16, 2014, which is hereby incorporated by reference in its entirety.

TECHNICAL FIELD

The present disclosure relates generally to aftertreatment systems for use with dual-fuel engines.

BACKGROUND

Harmful emissions remain a concern for many engine systems, particularly as engines are being subjected to increasingly strict emission standards. The emission standards for engines may vary depending on the type of engine. For example, diesel engines may have different standards than dual-fuel engines. Engines may use aftertreatment systems to treat exhaust exiting the cylinders of an engine. However, aftertreatment systems for engines operating in dual-fuel modes currently encounter a number of challenges. Such challenges include reducing short-chain hydrocarbons such as methane and ethane during the dual-fuel mode, maintaining stable performance of catalysts, tolerating catalysts under poisoning conditions, and diagnosing the health of catalysts onboard.

SUMMARY

Various embodiments provide for a method of treating exhaust from a dual-fuel engine. The method comprises determining an operating mode of the dual-fuel engine. Upon determining that the dual-fuel engine is operating in a dual-fuel mode or a natural gas mode, the dual-fuel engine operates in a stoichiometric operating condition, and the exhaust is received into a three-way catalyst communicatively connected to a selective catalytic reduction catalyst. In some embodiments, the three-way catalyst facilitates desulfation of the selective catalytic reduction catalyst. Upon determining that the dual-fuel engine is not operating in the dual-fuel mode or the natural gas mode, the engine operates in a lean operating condition.

Further embodiments provide a controller for use in an aftertreatment system. The controller comprises a determination module, an operation mode module, a dosing module, and a fuel injection module. The determination module is configured to determine an operating mode of a dual-fuel engine. The operation module is configured to operate the dual-fuel engine in a stoichiometric operating condition when the dual-fuel engine is operating in a natural gas mode or a dual-fuel mode. The operation module operates the dual-fuel engine in a lean operating condition when the dual-fuel engine is not operating in the dual-fuel mode or the natural gas mode. The dosing module is configured to control the injection of urea into exhaust downstream from the dual-fuel engine. In various embodiments, the dosing module communicates with the operation module to determine when to allow the injection of the urea. The fuel injection module is configured to control an air-fuel ratio in the dual-fuel engine based upon the operating mode of the dual-fuel engine.

Still further embodiments provide an aftertreatment system configured to be used with a dual-fuel engine operable in a plurality of operating modes. The aftertreatment system comprises a three-way catalyst, a selective catalytic reduction catalyst, and a controller. The three-way catalyst is positioned downstream of the dual-fuel engine and is configured to receive exhaust from the dual-fuel engine. The selective catalytic reduction catalyst is communicatively connected to the three-way catalyst and is positioned downstream of the dual-fuel engine. In some embodiments, the controller is configured to determine the operating mode of the dual-fuel engine. The controller operates the dual-fuel engine in a stoichiometric operating condition when the dual-fuel engine is in a dual-fuel mode or a natural gas mode. The controller operates the dual-fuel engine in a lean operating condition when the dual-fuel engine is not in the dual-fuel mode or the natural gas mode.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION OF VARIOUS EMBODIMENTS

The systems and methods described below provide for aftertreatment systems configured to be used in natural gas and diesel dual-fuel engines. The aftertreatment system architecture may be used to meet emission regulations. For example, the aftertreatment system may be used to meet Tier 4 emission standards, which mandated substantial reductions and limits of harmful substances such as nitrogen oxides (NOx), hydrocarbons, and particulate matter. The aftertreatment systems described further below can also be used to meet future methane emission regulations for diesel and natural gas dual-fuel engines. In some embodiments, the aftertreatment systems described herein may be packaged into existing engine systems.

In some embodiments, the aftertreatment system utilizes a three-way catalyst and a selective catalytic reduction catalyst. In other embodiments, the aftertreatment system may utilize a plurality of three-way catalysts and/or a plurality of selective catalytic reduction catalysts. The three-way catalyst may be used to reduce harmful substances such as nitrogen oxides, carbon monoxide, and non-methane hydrocarbons during the diesel and natural gas dual-fuel mode. The selective catalytic reduction catalyst may be used for nitrogen oxide reduction when the dual-fuel engine is operating in the diesel only mode.

The dual-fuel engine may be configured to operate in different modes, for example, a natural gas mode, a diesel fuel mode, or a dual-fuel mode. When the engine is operating in the diesel mode, the engine operates in a wide air-to-fuel ratio according to one embodiment. In the dual-fuel mode and the natural gas mode, the engine is required to operate in an air-to-fuel ratio so as to enable the use of the three-way catalyst in another embodiment. Further detail regarding the engine operation modes with regard to the aftertreatment system is discussed further below.

Figure 1:
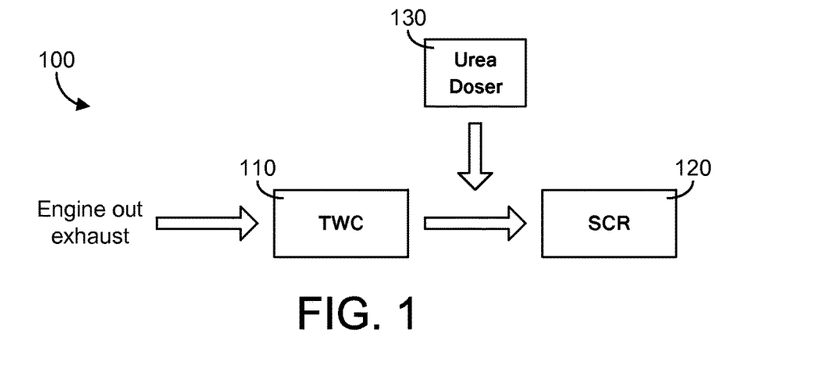
FIG. 1 is a schematic drawing of an aftertreatment system with the three-way catalyst positioned in front of the selective catalytic reduction catalyst, according to an example embodiment.
Figure 3:
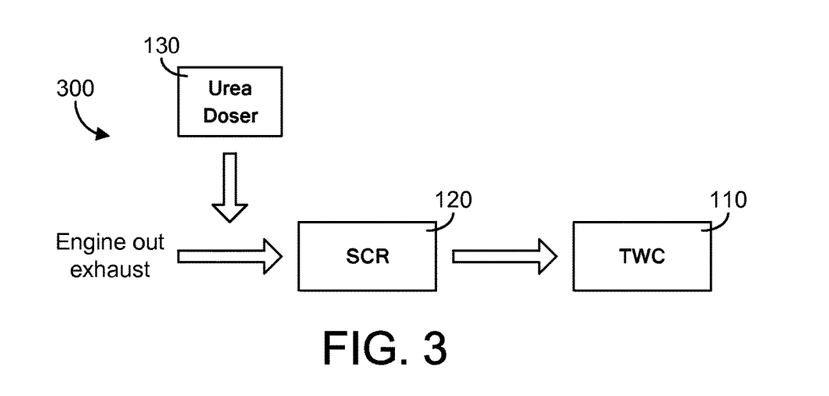
FIG. 3 is a schematic drawing of an aftertreatment system with the selective catalytic reduction catalyst positioned in front of the three-way catalyst, according to another example embodiment.

FIGS. 1 and 3 depict exemplary aftertreatment systems comprising a three-way catalyst 110 and a selective catalytic reduction catalyst 120. The three-way catalyst 110 is used to convert harmful emissions into non-toxic end product that will be released into the atmosphere. The three-way catalyst 110 converts the emissions by creating a chemical reaction with the exhaust, which may contain nitrogen oxide, hydrocarbons, carbon monoxides, particulate matter, etc. The exhaust may pass through a honeycomb structure coated with substances (e.g., aluminum oxide, platinum, and palladium) that promote the oxidation process. In one particular implementation, a combination of platinum, palladium and rhodium is used for the three-way catalyst 110. It should be recognized, however, that other materials known in the art may also be used.

The exhaust gas may chemically react with the substances to produce new chemical compounds. In some embodiments, carbon monoxide interacts with the surfaces to produce carbon dioxide, nitrogen results from nitrogen oxides, and hydrocarbons interact to produce water and carbon dioxide. In one embodiment, the three-way catalyst 110 is used on compression ignited engines. According to another embodiment, the three-way catalyst 110 may be used with the selective catalytic reduction catalyst 120 to reduce and/or oxidize substances in engine emissions. According to another embodiment, the selective catalytic reduction catalyst 120 may be used to convert nitrogen oxides into less harmful substances such as nitrogen and water. To facilitate the conversion, the selective catalytic reduction catalyst 120 may use a reductant such as urea to reduce the nitrogen oxides into diatomic nitrogen and water, for example.

Referring to FIG. 1, a schematic drawing of an aftertreatment system 100 having a three-way catalyst 110 positioned in front of a selective catalytic reduction catalyst 120 according to an example embodiment is shown. FIG. 1 represents one configuration of the aftertreatment system of the disclosure. Exhaust exiting the engine enters into the three-way catalyst 110. The exhaust exits the three-way catalyst 110 and enters the selective catalytic reduction catalyst 120 positioned downstream of the three-way catalyst 110. According to some embodiments, a urea doser 130 is configured to inject urea into the exhaust exiting the three-way catalyst 110 prior to the exhaust entering into the selective catalytic reduction catalyst 120.

As depicted in FIG. 1, the selective catalytic reduction catalyst 120 is used to reduce engine-out nitrogen oxides. Engine-out nitrogen oxides may comprise nitrogen oxides exiting the engine system to which the aftertreatment system is connected. The selective catalytic reduction catalyst 120 may have several elements as a base. In one example, the selective catalytic reduction catalyst 120 is a vanadia based catalyst, e.g., including a vanadia-supported zeolite. In another embodiment, the selective catalytic reduction catalyst 120 is a copper based catalyst, e.g., including a copper-supported zeolite. In yet another embodiment, the selective catalytic reduction catalyst 120 is an iron based catalyst, e.g., including an iron-supported zeolite. In still another embodiment, the selective reduction catalyst 120 can be formed from various combinations of vanadia, copper and/or iron-supported zeolites. Still other materials may be used for the selective reduction catalyst as well.

As described in reference to FIG. 1, the selective reduction catalyst 120 may be a "stand-alone" selective reduction catalyst 120, for example a copper zeolite or iron zeolite catalyst. However, it should also be noted that this element can also be a combination of a selective reduction catalyst and an ammonia slip catalyst (ASC). An ASC is used reduce $NH_3$ slip from the SCR portion of the catalyst. The combination of a SCR and an ASC may be useful in the configuration depicted in FIG. 1 for the purpose of reducing $NH_3$ slip from the aftertreatment system 100.

The function of the three-way catalyst 110 may vary based on the engine operation modes, as described further below. For example, the three-way catalyst 110 may serve one function while the engine is operating in the dual-fuel mode or natural gas mode, and the three-way catalyst 110 may serve a separate function while the engine is operating in the diesel mode. The three-way catalyst 110 may also have several elements as a base. In one example, the three-way catalyst 110 is a platinum based catalyst. In another example, the three-way catalyst 110 is a palladium based catalyst. In yet another example, the three-way catalyst 110 is a rhodium based catalyst.

Figure 2:
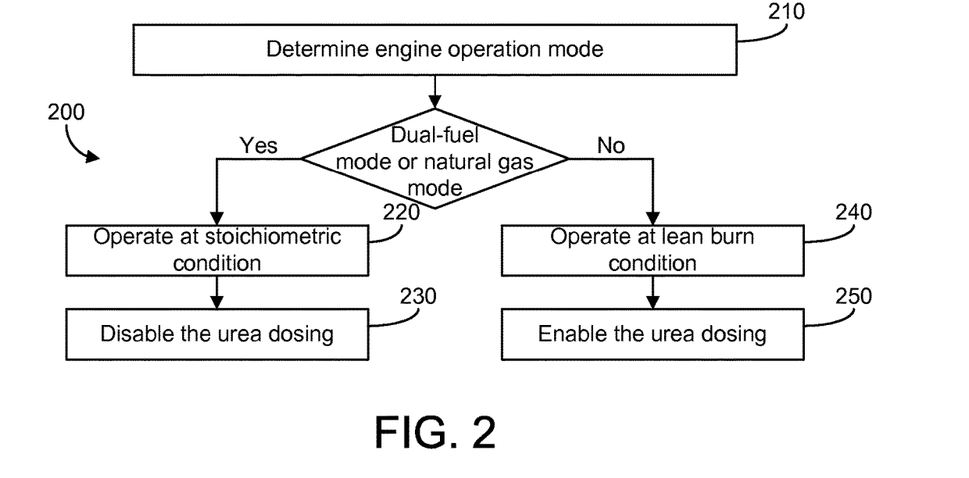
FIG. 2 is a schematic flow diagram of a process of operation for the aftertreatment system of FIG. 1.

FIG. 2 is a schematic flow diagram of an operation process 200 for the aftertreatment system 100 of FIG. 1. At 210, the mode in which the dual-fuel engine is operating is determined. In this particular implementation, the dual-fuel engine may be set to operate in a diesel mode, a natural gas mode, or a dual-fuel mode. In the diesel mode, the dual-fuel engine uses diesel fuel to operate. In the natural gas mode, the dual-fuel engine uses natural gas to operate. In the dual-fuel mode, the engine uses both natural gas and diesel fuel to operate. According to one embodiment, when the engine operates in the dual-fuel mode, the natural gas may be introduced through an engine system's intake system by being mixed with air drawn into the engine system. The air/natural gas mixture is then be drawn into the engine cylinders, where diesel fuel is injected. The air/natural gas mixture, along with the injected diesel fuel, is compressed to ignite combustion within the engine cylinders.

According to some embodiments, the engine is operating in a wide air-to-fuel ratio while in the diesel mode. The selective catalytic reduction catalyst 120 may be used to reduce nitrogen oxide emission with proper urea dosing. The selective catalytic reduction catalyst 120 may also be used to store potential ammonia slips from the three-way catalyst 110. According to the aftertreatment system 100 shown in FIG. 1, where the three-way catalyst 110 is placed in front of the selective catalytic reduction catalyst 120, the three-way catalyst 110 may be used for several purposes. In one embodiment, the three-way catalyst 110 is used to oxidize nitrogen oxides into nitrogen dioxide. The three-way catalyst 110 may also be used to oxidize carbon monoxide and hydrocarbons exiting the engine (e.g., the dual-fuel engine).

If the engine is operating in a dual-fuel mode or a natural gas mode, then the operation proceeds to 220 and/or 230. At 220, the engine operates at a stoichiometric condition. For example, under stoichiometric conditions, just enough air is provided for the combustion process to completely burn all of the fuel. In some embodiments, the operation of the engine at stoichiometric conditions enables the use of the three-way catalyst 110 in the aftertreatment system 100. In one embodiment, the three-way catalyst 110 is configured to reduce engine out nitrogen oxides, carbon monoxide, and hydrocarbons at the same time. In other embodiments, the operation of the three-way catalyst 110 requires high temperatures, for example, temperatures of 500 degrees Celsius or greater. The operation of three-way catalyst 110 at this high temperature also enables the desulfation of the selective catalytic reduction catalyst 120, in some embodiments. The selective catalytic reduction catalyst 120 may further be used to store potential ammonia slips from the three-way catalyst 110.

At 230, the urea dosing is disabled. In some embodiments, urea dosing of nitrogen oxide reduction is not required, particularly where the engine system or the aftertreatment system is not targeting high nitrogen oxide conversion efficiency. Therefore, the urea doser is disabled 130 from injecting urea fluid into the selective catalytic reduction catalyst 120 to reduce nitrogen oxides. In other embodiments, the process 200 may re-enable urea dosing if the process 200 is targeting for high nitrogen oxide conversion efficiency.

If the engine is not operating in a dual-fuel mode or a natural gas mode (for example, the engine is operating in diesel mode), then the operation proceeds to 240 and/or 250. At 240, the engine operates in a lean condition. During the lean condition, the engine contains a higher air-fuel ratio above stoichiometric during operation. In one embodiment, the three-way catalyst 110 is configured to oxidize nitrogen into nitrogen dioxide and reduce hydrocarbons and carbon monoxides.

At 250, the urea dosing is enabled. According to one embodiment, the urea doser 130 is enabled such that the urea doser 130 injects urea into the exhaust entering the selective catalytic reduction catalyst 120. The selective catalytic reduction catalyst 120 can be used to reduce nitrogen oxides. The urea injected into the selective catalytic reduction catalyst 120 facilitates the reduction of the nitrogen oxide exiting the three-way catalyst 110.

Referring to FIG. 3, a schematic drawing of an aftertreatment system 100 in a different arrangement, with the selective catalytic reduction catalyst 120 positioned in front of the three-way catalyst 110 is shown. Exhaust exiting the engine enters into the selective catalytic reduction catalyst 120. The exhaust exits the selective catalytic reduction catalyst 120 and enter into the three-way catalyst 110. The urea doser 130 is configured to inject urea into the exhaust exiting the engine prior to receiving the exhaust into the selective catalytic reduction catalyst 120. In one embodiment, the selective catalytic reduction catalyst 120 is used to reduce nitrogen oxides exiting the engine. The three-way catalyst 110 may be used for various purposes described further below.

Figure 4:
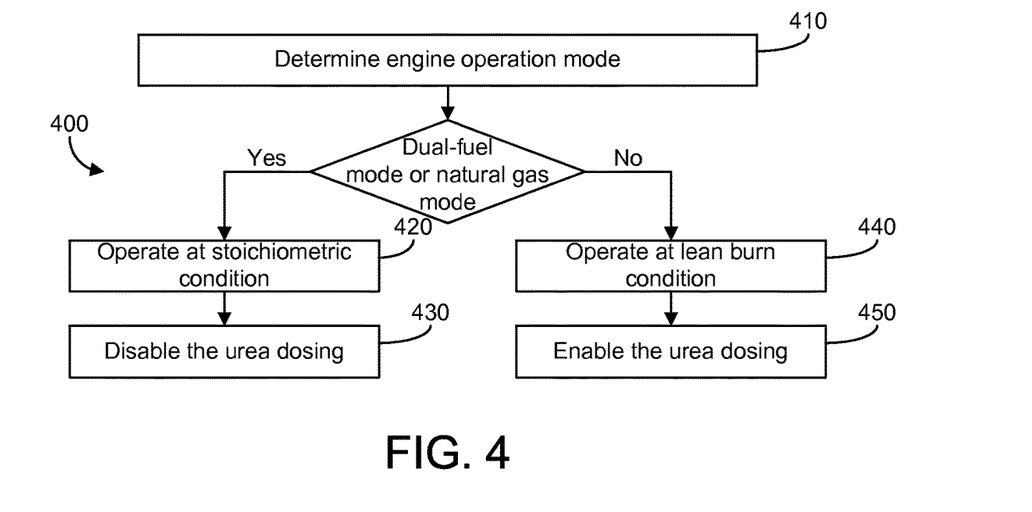
FIG. 4 a schematic flow diagram of a process of operation for the aftertreatment system of FIG. 3.

Referring to FIG. 4, a schematic flow diagram of an operation process 400 for the aftertreatment system of FIG. 3 is shown. At 410, the mode in which the dual-fuel engine is operating is determined. As discussed above, the dual-fuel engine may be set to operate in a diesel mode, a natural gas mode, or a dual-fuel mode. In one embodiment, the engine uses a wide air-to-fuel ratio when operating in the diesel mode. According to another embodiment, when operating in the dual-fuel mode or the natural gas mode, the engine operates in an air-to-fuel ratio as to enable the use of the three-way catalyst 110 (e.g., at or near stoichiometric).

When the engine is operating in a dual-fuel mode or a natural gas mode, the operation proceeds to 420 and/or 430. At 420, the engine operates at a stoichiometric condition (e.g., just enough air is provided for the combustion process to completely burn all of the fuel). In one embodiment, the three-way catalyst 110 is configured to reduce nitrogen oxides, carbon monoxide, and hydrocarbons. The operation of the three-way catalyst 110, in some embodiments, requires high temperatures (e.g., 500 degrees Celsius or greater). The high temperature used to operate the three-way catalyst 110 may also desulfate the selective catalytic reduction catalyst 120. The selective catalytic reduction catalyst 120 reduces nitrogen oxides according to one example.

If the engine is not operating in a dual-fuel mode or a natural gas mode (e.g., when the engine is operating in a diesel mode), then the operation proceeds to 440 and/or 450. At 440, the engine operate in a lean condition. During the lean condition, the engine contains a higher air-fuel ratio above stoichiometric during operation. In one embodiment, the three-way catalyst 110 is configured to reduce ammonia slip out of the selective catalytic reduction catalyst 120. In another embodiment, the three-way catalyst 110 is configured to reduce carbon monoxide exiting the selective catalytic reduction catalyst 120. In yet another embodiment, the three-way catalyst 110 is configured to reduce hydrocarbons out of the selective catalytic reduction catalyst 120.

At 450, the urea dosing is enabled. According to one embodiment, the urea doser 130 may be enabled such that the urea doser 130 injects urea into the exhaust entering the selective catalytic reduction catalyst 120. The selective catalytic reduction catalyst 120 can be used to reduce nitrogen oxides. The urea injected into the selective catalytic reduction catalyst 120 facilitates the reduction of the nitrogen oxide exiting the engine.

The aftertreatment systems described throughout the specification may provide significant advantages. For example, one advantage includes the capability to maintain catalyst performance during operation. The usage of three-way catalyst 110 requires fast oscillation between hydrocarbon-lean and hydrocarbon-rich conditions around the stoichiometric point. In this condition, temperature oscillation can be compensated by the exothermal from hydrocarbon oxidation over the three-way catalyst 110. This results in a more stable catalyst temperature, which in turn leads to stable performance of the catalysts and aftertreatment system. The system also allows for high tolerance of sulfur poisoning. Since the environment rapidly changes between hydrocarbon-lean and hydrocarbon-rich over the three-way catalyst 110, the sulphur oxides stored during the hydrocarbon-lean environment can be reduced to hydrogen sulphide and leave the catalyst during the hydrocarbon-rich environment. Hence, the three-way catalyst 110 can perform well with certain amounts of sulfur in portions of the three-way catalyst 110 and/or the aftertreatment system 100.

In other embodiments, the systems described throughout may be configured to minimize urea consumption. For example, when the engine is operating in the dual-fuel mode, the three-way catalyst 110 can reduce nitrogen oxides and thus urea dosing over selective catalytic reduction catalyst 120 is not required. This lowers the urea consumption by the selective catalytic reduction catalyst 120. The capability for on-board diagnostics of the health of the catalyst is afforded by the aftertreatment systems 100 described throughout. Nitrogen oxide conversion during the dual-fuel mode of engine operation can be used to monitor the health of the three-way catalyst 110. For example, a lowered rate of nitrogen oxide conversion may indicate a failing health of the three-way catalyst 110.

Figure 5:
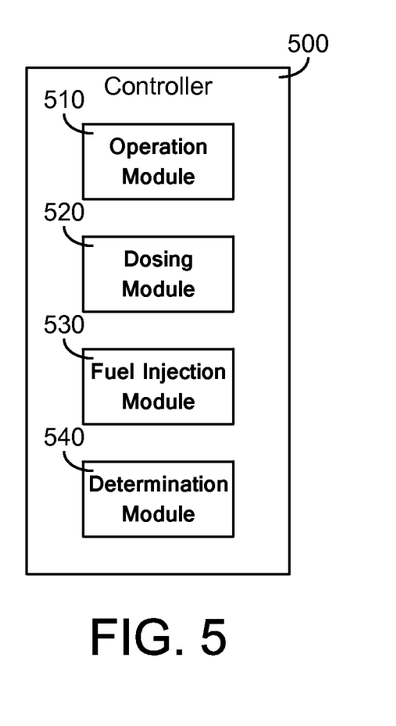
FIG. 5 is a block diagram of a controller module configured for use in an engine system with the aftertreatment systems of FIG. 1 and FIG. 3, according to one embodiment.

In certain embodiments, the engine system may comprise a controller 500 structured to perform certain operations to operate the engine system according to the operations disclosed throughout the disclosure, including running the cylinders of the engine and injecting urea into portions of the aftertreatment system. In certain embodiments, the controller 500 forms a portion of a processing subsystem including one or more computing devices having memory, processing unit, and communication hardware. The memory may be configured to store instructions (e.g., computer code) to operate and control the engine system and components within the engine system as described throughout the disclosure. The processing unit is configured to execute instructions within the memory, and the communication hardware comprises hardware and/or software that facilitate mechanical and/or electrical communication. The controller 500 may comprise a single device or a distributed device, and the functions of the controller 500 may be performed by hardware and/or as computer instructions on a non-transient computer readable storage medium.

In certain embodiments, the controller 500 includes one or more modules structured to functionally execute the operations of the controller 500. In certain embodiments, the controller includes an operation module 510, a dosing module 520, a fuel injection module 530, and a determination module 540. The description herein including modules emphasizes the structural independence of the aspects of the controller 500 and illustrates one grouping of operations and responsibilities of the controller 500. Other groupings that execute similar overall operations are understood within the scope of the present disclosure. Modules may be implemented in hardware and/or as computer instructions on a non-transient computer readable storage medium, and modules, and or components operating the modules, may be distributed across various hardware or computer based components. More specific descriptions of certain embodiments of controller operations are included in the section referencing FIG. 5.

Example and non-limiting module implementation elements include sensors providing any value, measurement, or information determined herein, sensors providing any value, measurement, or information that is a precursor to a value, measurement, or information determined herein, datalink and/or network hardware including communication chips, oscillating crystals, wireless technology, radio receiver technology, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include may include operations to interpret and/or to determine one or more parameters. Interpreting or determining, as utilized herein, includes receiving values, measurements, or information by any method known in the art, including at least receiving values, measurements, or information from a datalink or network communication, receiving an electronic signal (e.g. a voltage, frequency, current, or PWM signal) indicative of the value, receiving a computer generated parameter indicative of the value, measurement, or information, reading the value, measurement, or information from a memory location on a non-transient computer readable storage medium, receiving the value, measurement, or information as a run-time parameter by any means known in the art, and/or by receiving the value, measurement, or information by which the interpreted parameter can be calculated, and/or by referencing a default value that is interpreted to be the parameter value.

FIG. 5 is a block diagram of a controller 150 configured for use in an engine system with the aftertreatment systems of FIG. 1 and FIG. 3, according to an example embodiment. The controller 500 comprises an operation module 510, a dosing module 520, a fuel injection module 530, and a determination module 540, according to certain embodiments. The operation module 510, the dosing module 520, the fuel injection module 530, and the determination module are configured to communicate with each other along with other systems to implement the functions described throughout. The controller 500 may embody further features and capabilities as described throughout the disclosure.

According to one embodiment, the operation module 510 is configured to switch operational modes of the engine. For example, the operation module 510 may switch the engine among diesel mode, a natural gas mode, and a dual-fuel mode. Switching operational modes may involve communicating with various parts of the engine system, including systems communicable with a diesel injector, a natural gas injector, a turbine, compressor, turbocharger, etc. The dosing module 520 is configured to control the injection of urea into the exhaust. The dosing module 520 may communicate with the operation module 510 to determine when to allow injection of the urea. For example, the dosing module 520 may prevent the dosage of urea into the selective catalytic reduction catalyst 120 exhaust stream when the engine is in the natural gas mode or the dual-fuel mode.

The fuel injection module 530 is configured to control an air-fuel ratio based upon the operational mode of the engine. For example, when the engine is operating in the diesel mode, the fuel injection module 530 facilitates injection of diesel fuel such that the engine burns in a lean condition in one embodiment. In another embodiment, when the engine operates in the natural gas mode or the dual-fuel mode, the fuel injection module 530 facilitates injection of the diesel fuel such that the engine burns in a stoichiometric condition. The fuel injection module 530 may also facilitate the injection of natural gas during the natural gas mode and/or the dual-fuel mode. The fuel injection module 530 may communicate with other systems and modules to determine the amount of fuel (e.g., diesel and/or natural) to inject into the engine. The determination module 540 is configured to determine an operating mode of a dual-fuel engine. For example, the determination module 540 determines whether the system is operating in the natural gas mode, the diesel mode, or the dual-fuel mode.

The foregoing description of embodiments of the disclosure has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the disclosure in various embodiments and with various modifications as are suited to the particular use contemplated. Other substitutions, modifications, changes and omissions may be made in the disclosure's operating conditions and arrangement of the embodiments without departing from the scope of the present invention.

What is claimed is:

1. A method of treating exhaust from a dual-fuel engine, comprising:

determining an operating mode of the dual-fuel engine;
upon determining that the dual-fuel engine is operating in a dual-fuel mode or a natural gas mode:
  operating the dual-fuel engine at or near a stoichiometric operating condition, and
  receiving the exhaust into a three-way catalyst communicatively connected to a selective catalytic reduction catalyst, and operating the three-way catalyst at a temperature of 500 degrees Celsius or greater to facilitate desulfation of the selective catalytic reduction catalyst; and
upon determining that the dual-fuel engine is not operating in the dual-fuel mode or the natural gas mode, operating the engine in a lean operating condition.

2. The method of claim 1, further comprising disabling urea dosing when the dual-fuel engine is operating in the dual-fuel mode or the natural gas mode.

3. The method of claim 1, further comprising enabling urea dosing when the dual-fuel engine is not operating in the dual-fuel mode or the natural gas mode.

4. The method of claim 1, wherein the three-way catalyst is configured to reduce nitrogen oxide, carbon monoxide, and hydrocarbons when the dual-fuel engine is operating at or near the stoichiometric operating condition and operating in the dual-fuel mode or the natural gas mode.

5. The method of claim 1, further comprising using the selective catalytic reduction catalyst to reduce nitrogen oxide when the dual-fuel engine is operating in the lean operating condition and is not operating in the dual-fuel mode or the natural gas mode.

6. The method of claim 1, wherein the selective catalytic reduction catalyst is positioned downstream of the three-way catalyst.

7. The method of claim 6, further comprising using the selective catalytic reduction catalyst to store potential ammonia slip from the three-way catalyst when the dual-fuel engine is operating at or near the stoichiometric operating condition and operating in the dual-fuel mode or the natural gas mode.

8. The method of claim 6, further comprising using the three-way catalyst to oxidize nitrogen oxide to nitrogen dioxide and reduce hydrocarbons and carbon monoxide when the dual-fuel engine is operating in the lean operating condition and is not operating in the dual-fuel mode or the natural gas mode.

9. The method of claim 6, wherein the three-way catalyst is configured to oxidize nitrogen oxide, carbon monoxide, and hydrocarbons when the dual-fuel engine is operating in the lean operating condition and is not operating in the dual-fuel mode or the natural gas mode.

10. The method of claim 1, wherein the selective catalytic reduction catalyst is positioned upstream of the three-way catalyst.

11. The method of claim 10, further comprising using the three-way catalyst to reduce ammonia, carbon monoxide, and hydrocarbons exiting the selective catalytic reduction catalyst when the dual-fuel engine is operating in the lean operating condition and is not operating in the dual-fuel mode or the natural gas mode.

12. The method of claim 1, further comprising operating the dual-fuel engine in a diesel mode when the dual-fuel engine is not operating in the dual-fuel mode or the natural gas mode.

13. A controller for use in an aftertreatment system that is configured to be used with a dual-fuel engine that is operable in a plurality of operating modes and that comprises a three-way catalyst positioned configured to receive exhaust from the dual-fuel engine, and a selective catalytic reduction catalyst communicatively connected to the three-way catalyst and positioned downstream of the dual-fuel engine, the controller comprising:
  a determination module configured to determine an operating mode of a dual-fuel engine;
  an operation module configured to operate the dual-fuel engine at or near a stoichiometric operating condition when the dual-fuel engine is operating in a natural gas mode or a dual-fuel mode, and to operate the dual-fuel engine in a lean operating condition when the dual-fuel engine is not operating in the dual-fuel mode or the natural gas mode;
  a dosing module configured to control the injection of urea into exhaust downstream from the dual-fuel engine, the dosing module communicating with the operation module to determine when to allow the injection of the urea; and
  a fuel injection module configured to control an air-fuel ratio in the dual-fuel engine based upon the operating mode of the dual-fuel engine,
  wherein the controller is configured to control the three-way catalyst to operate at a temperature of 500 degrees Celsius or greater to facilitate desulfation of the selective catalytic reduction catalyst when the dual-fuel engine is operating at or near the stoichiometric operating condition and operating in the dual-fuel mode or the natural gas mode.

14. The controller of claim 13, wherein the dosing module prevents the injection of the urea into the exhaust when the dual-fuel engine is operating at or near the stoichiometric operating condition and operating in the natural gas mode or the dual-fuel mode.

15. The controller of claim 13, wherein the dosing module enables the injection of the urea into the exhaust when the dual-fuel engine is operating in the lean operating condition and is not operating in the natural gas mode or the dual-fuel mode.

16. The controller of claim 13, wherein the dosing module enables the injection of the urea into the exhaust when the dual-fuel engine is operating in the lean operating condition and is operating in a diesel mode.

17. The controller of claim 13, wherein the fuel injection module creates a lean air-fuel ratio in the dual-fuel engine when the dual-fuel engine is not operating in the dual-fuel mode or the natural gas mode.

18. An aftertreatment system configured to be used with a dual-fuel engine operable in a plurality of operating modes, the aftertreatment system comprising:
  a three-way catalyst positioned downstream of the dual-fuel engine, the three-way catalyst configured to receive exhaust from the dual-fuel engine;
  a selective catalytic reduction catalyst communicatively connected to the three-way catalyst and positioned downstream of the dual-fuel engine; and
  a controller configured to determine the operating mode of the dual-fuel engine,
  wherein the controller operates the dual-fuel engine at or near a stoichiometric operating condition when the dual-fuel engine is in a dual-fuel mode or a natural gas mode, and wherein the controller operates the dual-fuel engine in a lean operating condition when the dual-fuel engine is not in the dual-fuel mode or the natural gas mode, and
  wherein the three-way catalyst is configured to operate at a temperature of 500 degrees Celsius or greater to facilitate desulfation of the selective catalytic reduction catalyst when the dual-fuel engine is operating at or near the stoichiometric operating condition and operating in the dual-fuel mode or the natural gas mode.

19. The aftertreatment system of claim 18, further comprising a doser configured to inject urea into the exhaust, wherein the selective catalytic reduction catalyst uses the urea injected by the doser to reduce nitrous oxide emissions exiting the three-way catalyst when the dual-fuel engine is operating in the lean operating condition and operating in a diesel mode.

20. The aftertreatment system of claim 18, wherein the three-way catalyst is configured to oxidize nitrous oxide exiting the dual-fuel engine into nitrogen dioxide when the dual-fuel engine is operating in the lean operating condition and is not operating in the dual-fuel mode or the natural gas mode.

21. The aftertreatment system of claim 18, wherein the three-way catalyst is configured to reduce carbon monoxide and hydrocarbons exiting the dual-fuel engine when the dual-fuel engine is operating in the lean operating condition and is not operating in the dual-fuel mode or the natural gas mode.

22. The aftertreatment system of claim 18, wherein the three-way catalyst is positioned downstream of the selective catalytic reduction catalyst.

23. The aftertreatment system of claim 22, wherein the three-way catalyst is configured to reduce ammonia, carbon monoxide, and hydrocarbons slipping from the selective catalytic reduction catalyst when the dual-fuel engine is operating in the lean operating condition and is not operating in the dual-fuel mode or the natural gas mode.

24. The aftertreatment system of claim 18, wherein the three-way catalyst is positioned upstream of the selective catalytic reduction catalyst.

* * * * *